United States Patent
McLafferty

[11] 3,860,885
[45] Jan. 14, 1975

[54] GAS LASER EXPANSION NOZZLES
[75] Inventor: George H. McLafferty, Manchester, Conn.
[73] Assignee: United Aircraft Corporation, East Hartford, Conn.
[22] Filed: Mar. 13, 1973
[21] Appl. No.: 340,866

[52] U.S. Cl.......... 331/94.5 P, 331/94.5 D, 239/556
[51] Int. Cl.............................................. H01s 3/02
[58] Field of Search... 138/40, 44; 331/94.5, 94.5 P, 331/94.5 D; 239/556, 265.11, 555; 6/257; 350/319; 331/94.5 P

[56] References Cited
UNITED STATES PATENTS

| | | | |
|---|---|---|---|
| 2,163,382 | 6/1939 | Noble | 138/40 X |
| 2,670,011 | 2/1954 | Bertin et al. | 138/44 |
| 2,959,916 | 11/1960 | Carlton et al. | 138/40 |
| 3,115,747 | 12/1963 | Hausmann | 60/257 X |
| 3,572,391 | 3/1971 | Hirsch | 138/40 |
| 3,602,432 | 8/1971 | Mulready | 239/265.11 |
| 3,617,928 | 11/1971 | Housmann | 331/94.5 |

Primary Examiner—Jerry W. Myracle
Assistant Examiner—Daniel M. Yasich
Attorney, Agent, or Firm—Anthony J. Criso

[57] ABSTRACT

A supersonic expansion nozzle arrangement which is especially useful in high-power flowing gas laser systems is disclosed. The arrangement comprises a plurality of specially contoured two-dimensional nozzle elements which are combined in a staggered array upstream of a laser cavity. Since each element can produce a characteristic shock and expansion wave patterns that radiate in the downstream direction, the staggered array prevents the individual wave patterns from aligning themselves and the severity of the phase front variations in the laser is reduced. The optical quality of the laser energy passing across the gas flow is significantly improved.

5 Claims, 4 Drawing Figures

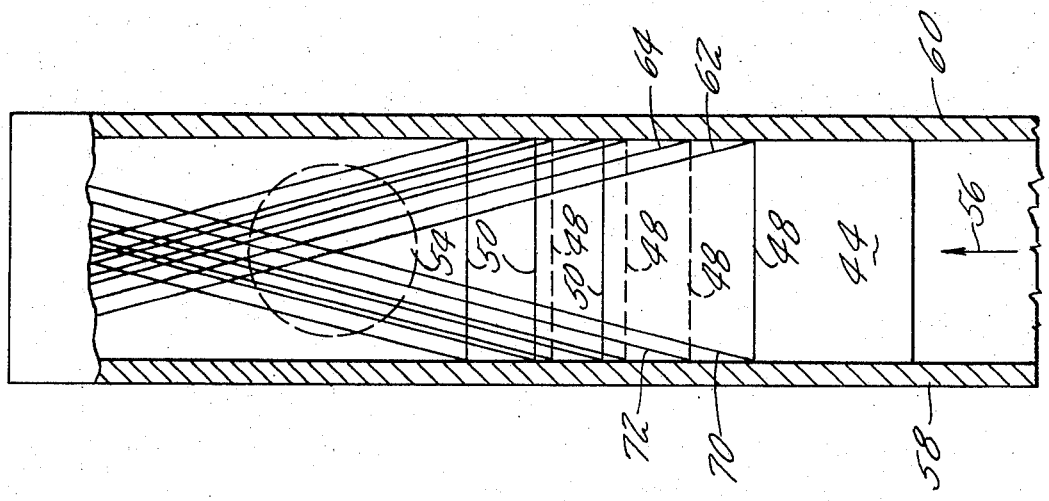
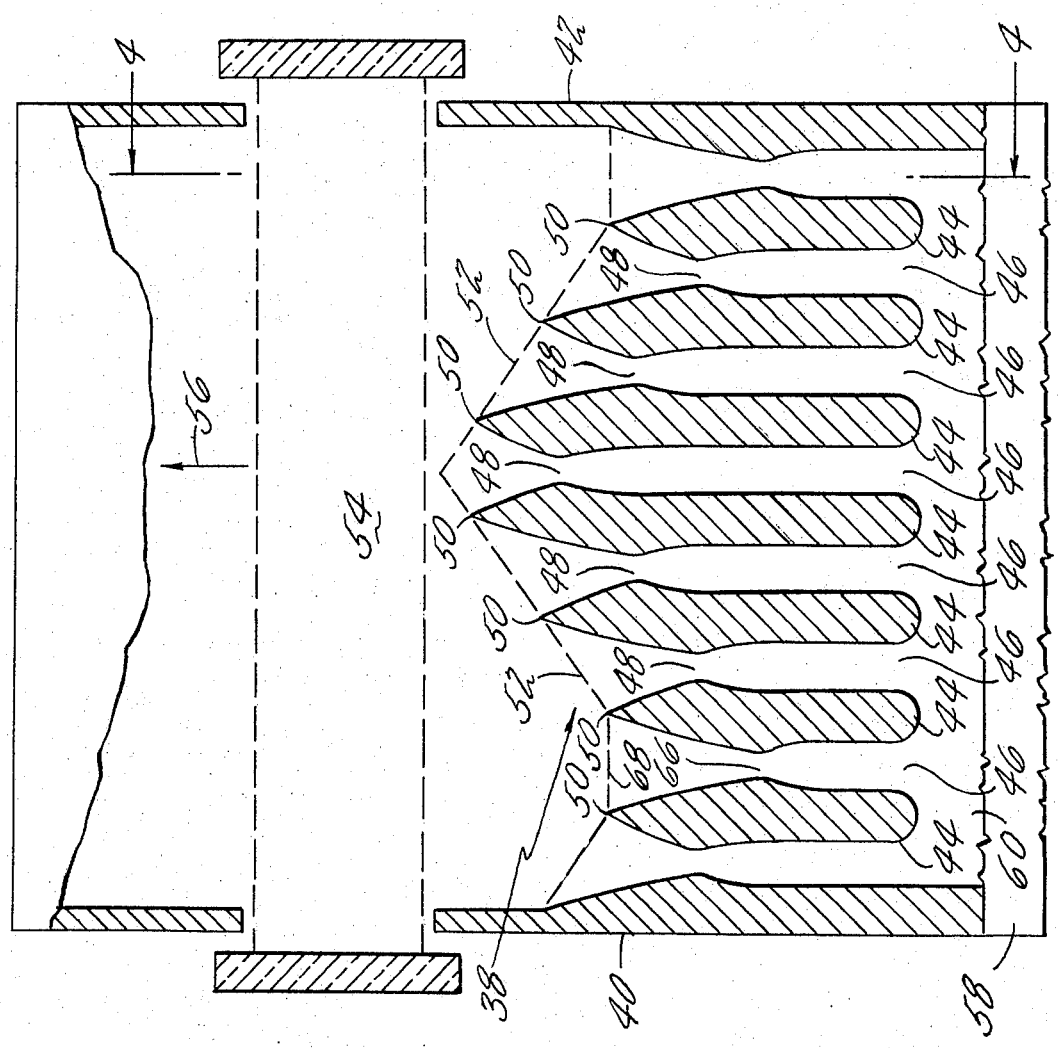

GAS LASER EXPANSION NOZZLES

BACKGROUND OF THE INVENTION

1. Field of Invention

This invention relates primarily to gas lasers and more particularly to supersonic nozzle geometries in flowing gas laser systems.

2. Description of the prior Art

The expansion of a fluid from subsonic to supersonic velocity is common in many fluid flow applications. During such an expansion, even the most carefully designed aerodynamic nozzles produce some shock or expansion waves in the divergent section of the nozzle, particularly when the flow rate through the nozzle is at an off design condition. When a wave is produced in an expansion nozzle or any other device, a pressure differential and a density variation of the working fluid results across the wave.

Many laser systems having an expansion nozzle to accelerate the gaseous working medium experience waves due to non-ideal rapid expansion of the working medium. The waves can be caused by a non-uniform rate of growth of the boundary layer displacement thickness in the end walls of the nozzles. The density variations in the gas stream due to the presence of waves are detrimental to the quality of the optical beam of laser radiation produced. Various attempts have been made to eliminate the optical distortions in the laser output caused by these waves, but none are considered adequate.

SUMMARY OF THE INVENTION

An object of the present invention is to reduce the disturbances to the phase front of a beam of laser radiation produced in a flowing gas laser system having supersonic expansion nozzles.

Another object of the present invention is to utilize the expansion wave associated with a shock wave to compensate for the density variations in the working fluid due to the waves in a system having a plurality of adjacent expansion nozzles arranged to form parallel flow paths.

According to the present invention a nozzle array in a high-power flowing gas laser is formed from a plurality of individual nozzle elements which define parallel flow passages, each nozzle element having a throat region which is staggered with respect to the throat region of the immediately adjacent nozzle sections.

A primary advantage of the present invention is, the density variation due to the non-ideal expansion of the working medium of a gas laser system is spread out over a large area of the optical region of the laser cavity. Further, this invention reduces the intensity of any phase front distortion in the output laser radiation which is due to density variations across the working medium in the laser cavity. Another advantage of the offset nozzle arrangement in accordance with the present invention is the utilization of the expansion wave which follows each shock wave to lessen the effect on the density variation of the working medium caused by the shock wave from an adjacent nozzle section. One overall benefit from this invention is the improved quality of the optical beam produced in a flowing gas laser having multiple nozzle with staggered throat regions.

A primary feature of the present invention is the physical offset of the throat region of any given nozzle with respect to the throat region of the adjacent nozzles. In maintaining the staggered nozzle throat arrangement, the opposite sides of each individual nozzle throat are aligned, however, each individual nozzle element is asymmetric.

The foregoing and other objects, features and advantages of the present invention will become more apparent in the light of the following detailed description of a preferred embodiment thereof as illustrated in the accompanying drawing.

BRIEF DESCRIPTION OF THE DRAWING

FIG. 3 is a simplified, partially broken-away, top view of a nozzle assembly containing a plurality of twodimensional nozzles arranged with offset throat regions in a flowing gas laser in accordance with the present invention; and FIG. 4 is a schematic elevation section taken along the line 4—4 of FIG. 3.

BRIEF DESCRIPTION OF THE PREFERRED EMBODIMENT

Figure 1:
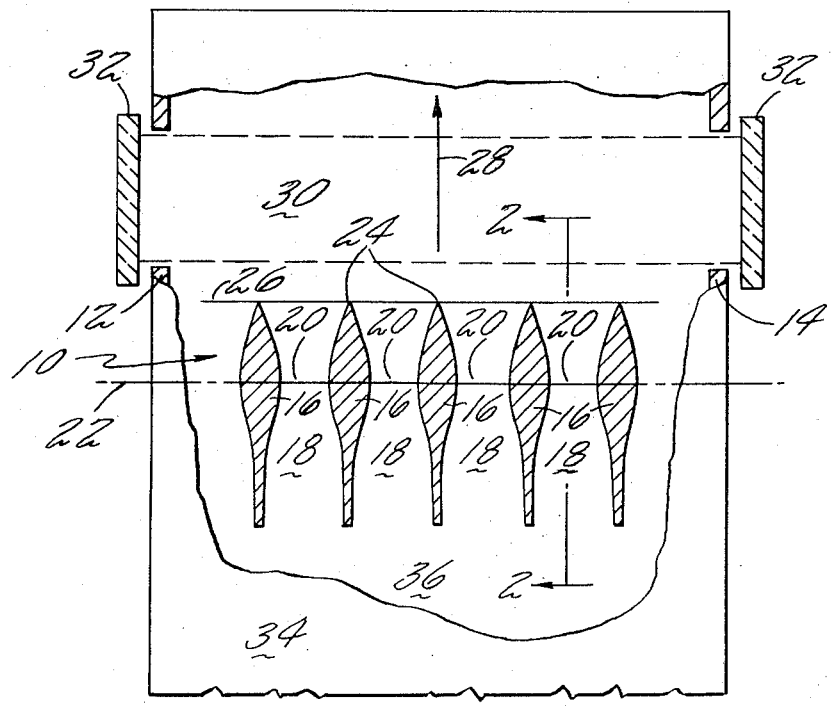
FIG. 1 is a simplified, partially broken-away, schematic top view of the nozzle assembly in a typical high-power flowing gas laser according to the prior art.

The production of a good quality optical beam from a flowing gas laser requires that the flow conditions of the laser medium be reasonably uniform. Density gradients, particularly those due to shock waves or expansion fans, should be avoided or at least minimized. In many of the current flowing gas laser systems a multiple nozzle arrangement such as the typical one shown in FIG. 1 is required in order to more effectively convert the excitation energy of the gas into laser energy. Referring to FIG. 1, the gas flows through a nozzle array 10 which is formed between a left side wall 12 and a right side wall 14. Nozzle elements 16 form parallel flow passages 18 and each pair of adjacent nozzle elements defines a throat region 20. The throat regions of all of the parallel flow passages fall along an essentially straight line 22 which is perpendicular to the side walls 12, 14. Each nozzle element is terminated in a knife edge 24 and all of the knife edges are aligned to form a knife edge plane 26 which is also perpendicular to the side walls 12, 14.

Figure 2:
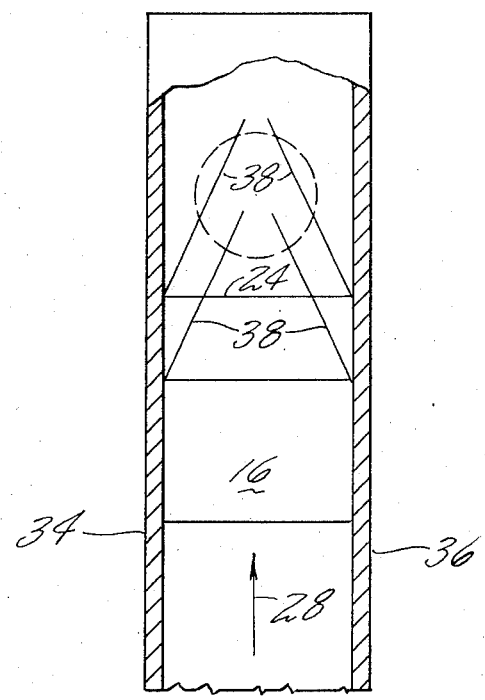
FIG. 2 is a schematic elevation section taken along the line 2—2 of FIG. 1.

During the operation of the apparatus shown, a flowing gas moves in a direction 28 through an optical region 30 which is formed downstream of the nozzle array and between the mirrors 32. The gas flows in a channel formed by the side walls 12, 14, a front wall 34 and a back wall 36. As the gas expands from a relatively high pressure, subsonic condition upstream of the nozzle to a relatively low pressure supersonic velocity condition downstream of the nozzle, well known aerodynamic effects such as non-uniform growth of the boundary layer displacement thickness produce a plurality of shock or expansion waves 38 which emanate from the nozzle array and propagate through the optical region as shown in FIG. 2. Individual shock or expansion waves often occur from disturbances near the knife edge and the throat area locations. The waves are a planar disturbance extending in the downstream direction at substantially the mach angle for the flow conditions involved. Each wave supports a pressure change in the flowing gas stream and concomitant with the pressure change is a density variation in the flowing gas stream. In the system described thus far, two waves are often produced between each pair of nozzle elements, one is produced near the knife edges and one is produced near the nozzle throat; further, each pair of waves is aligned with the waves from the adjacent areas so that across the optical region between the side walls 12, 14 the waves under discussion reinforce one another as is apparent from FIG. 2. In a gas laser application in which a beam of optical radiation passes through the optical region between the mirrors 32, the density variations in the gas associated with the waves produce undesirable refraction and diffraction effects in the laser radiation. These refraction and diffraction effects distort the phase front of the optical beam produced by the laser and they reduce the peak flux which can be obtained in the far field when the beam is focused.

In the system according to the present invention shown in FIG. 3, a staggered nozzle array 38 is formed between a left side wall 40 and a right side wall 42. A plurality of asymmetric nozzle elements 44 forms parallel flow passages 46 and throat regions 48. Each nozzle element is terminated by a knife edge 50 and all the knife edges combine to form a staggered knife edge profile 52. Similarly, the throat regions 48 of each of the parallel flow passages are staggered with respect to the throat regions of the adjacent flow passages and the overall throat region profile substantially follows the staggered knife edge profile. The knife edge profile is parallel to the line drawn through the nozzle throat regions.

The operation of a flowing gas laser in accordance with the present invention is as shown typically in FIG. 3 with an active gas flowing across an optical region 54 in a direction 56 results in wave patterns which are substantially different from those resulting from the operation of the prior art apparatus as described above and shown in FIGS. 1 and 2. As the laser gas moves through the channel formed by the side walls 40, 42, a front wall 58 and a back wall 60, the gas is expanded by the nozzle array 38. Expansion produces essentially four shock or expansion waves in each flow passage. Two waves 62, 64 emanate from the back wall where the individual nozzle elements forming the flow passage under consideration intersect with the back wall, the wave 62 bridging the throat region 48 along an imaginary line 66 and the wave 64 occurring near the knife edge connecting line 68; a corresponding pair of waves 70, 72 emanates from the front wall.

The cumulative effect from each of the flow pasages shown in FIG. 3 is shown schematically in FIG. 4. Each of the waves 62, 64, 70 72 extends downstream into the optical region at approximately the mach angle. However, any given throat region 48 is staggered with respect to the throat regions adjacent on either side and the waves are spread out somewhat uniformly across the optical region. The spreading or misalignment of the waves minimizes the intensity of the pressure variations and in turn the density variations in the gas flowing through the optical region. Although any density variation in the optical region causes disturbances in the phase front of the laser beam passing therethrough, the staggered nozzle array provides a significant reduction in the intensity of the density gradient disturbance. The staggered array avoids having waves from adjacent nozzle elements reinforce one another and also optically averages the effects of the density disturbances; each factor tends to improve the optical quality of the laser beam.

The optical region 54 has a length L. As a practical matter, the separation distance along the direction of flow 56 between the nozzle knife edge closest to the optical region and the knife edge farthest from the optical region should be significantly less than the length of the optical cavity.

Each nozzle element 44 in the staggered array is asymmetric in contour and various techniques are available for the selection of precise asymmetric nozzle contours. For example, the contours developed from sharp throat supersonic expansion nozzles are sometimes used. In this technique, a series of nozzles is designed from a sharp edged supersonic throat configuration by following different streamlines through the resultant flow, each streamline having a different radius of curvature near the throat. In a conventional or symmetric nozzle, the distance from the nozzle centerline to the streamline which forms the nozzle contour is the same on either side of the nozzle. Therefore, when the technique is applied to the present invention, the distance between the centerline of the nozzle and the streamline chosen is different for each side of an asymmetric nozzle and the result is a longer contour on one side of the nozzle centerline than on the other side of the centerline.

Wave cancellation with the staggered nozzle array in accordance with the present invention is posssible since each oblique shock wave disturbance in the nozzle is usually followed by an expansion wave disturbance which tends to return the flow to its original direction. Similarly, an expansion wave disturbance can be followed by a shock wave disturbance and in some cases the flow pattern is much more complex with alternating shock and expansion waves. in any case, the shock waves from one nozzle element can be aligned with the expansion waves from a nearby nozzle element to provide the desired wave cancellation and provide additional improvement in the uniformity of the beam created in the laser operated in accordance with the present invention.

The angle at which the nozzle elements are offset from one another is determined by the physical displacement of the waves desired in the optical region. Investigations have shown that relatively large angles are necessary in order to minimize the refraction of the laser beam and also to take full advantage of the mutual attenuation of the density disturbances which the present invention provides. Also the actual contour of the nozzle array is not limited to the geometry shown in FIG. 3. The individual nozzle elements can be arranged to form the indicated sawtooth profile and repeated to increase the width of the optical region. Alternatively, half of the indicated pattern is suitable for use with the present invention, either individually or in a repeating pattern to produce a second but different sawtooth pattern. Further, the basic teachings contained herein are applicable to an array of asymmetric nozzles having a straight knife edge plane which is not perpendicular to the direction of gas flow but forms some angle typically between 10 and 40° with the direction of the gas flow; in such an arrangement, the centerline of the optical cavity is maintained essentially parallel to the knife edge plane.

Although this invention has been shown and described with respect to preferred embodiments thereof, it should be understood by those skilled in the art that various changes and omissions in the form and detail thereof may be made therein without departing from the spirit and scope of the invention.

Having thus described typical embodiments of my invention, that which I claim as new and desire to secure by Letters Patent of the United States is:

1. In a flowing gas laser system for the production of an optical beam and including a channel having a flow axis in a direction along which the velocity of a gaseous working medium is increased to permit stimulated emission of laser radiation from the energy levels of the medium, nozzle means for aerodynamically expanding the medium to a supersonic velocity, the improved nozzle means comprising:

a plurality of individual nozzle elements, each of which has a centerline axis extending longitudinally therethrough, the nozzle elements being juxtaposed across the channel with each centerline axis being aligned parallel to the flow axis, a portion of each pair of adjacent elements forming a common throat region therebetween, with each throat region being displaced along the flow axis with respect to the throat region adjacent thereto.

2. The invention according to claim 1 wherein each nozzle element is geometrically asymmetric about its centerline axis.

3. In a flowing gas laser having a flow channel in which an array of nozzle elements provides rapid expansion of a gaseous working medium to provide stimulated emission of laser radiation in an optical region having an optical centerline and located in the channel downstream of the nozzles, a nozzle element configuration comprising:

a plurality of two-dimensional nozzle elements, each of which is terminated in a knife edge and has a centerline axis extending longitudinally therethrough, the nozzle elements being juxtaposed across the channel with each centerline axis being parallel to the flow axis, a portion of each pair of adjacent elements forming a common throat region therebetween and each throat region being displaced along the flow axis with respect to the throat region adjacent thereto.

4. The invention according to claim 3 wherein the axis of optical region is parallel to a plane which passes through the knife edge of each nozzle element.

5. The invention according to claim 4 wherein each nozzle element is geometrically asymmetric about its centerline axis.

* * * * *